(12) United States Patent
Kulumani

(10) Patent No.: US 9,275,406 B2
(45) Date of Patent: Mar. 1, 2016

(54) METHOD AND SYSTEM OF VENDING A COPY OF A DIGITAL IMAGE

(75) Inventor: Sriram Kulumani, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2567 days.

(21) Appl. No.: 11/827,750

(22) Filed: Jul. 13, 2007

(65) Prior Publication Data

US 2009/0015874 A1  Jan. 15, 2009

(51) Int. Cl.
  *G06K 15/00* (2006.01)
  *G06Q 30/06* (2012.01)
  *H04N 1/60* (2006.01)

(52) U.S. Cl.
  CPC .................................. *G06Q 30/06* (2013.01)

(58) Field of Classification Search
  USPC ............. 358/1.15, 1.1, 3.28; 709/219; 705/26
  See application file for complete search history.

(56) References Cited

U.S. PATENT DOCUMENTS

| 6,980,964 | B1 * | 12/2005 | Cocotis et al. ............... 705/7.25 |
| 7,120,593 | B1 * | 10/2006 | Fry et al. ...................... 705/27.1 |
| 2003/0182402 | A1 | 9/2003 | Goodman et al. |
| 2003/0229667 | A1 | 12/2003 | Pedersen et al. |
| 2004/0111493 | A1 * | 6/2004 | Yamaguchi et al. .......... 709/219 |
| 2006/0044599 | A1 * | 3/2006 | Lipowitz et al. ............. 358/1.15 |
| 2006/0114516 | A1 | 6/2006 | Rothschild |

FOREIGN PATENT DOCUMENTS

| EP | 1077414 A2 | 2/2001 |
| EP | 01586460 A1 | 10/2005 |
| WO | WO 03/081466 A2 | 10/2003 |
| WO | WO 2004/046982 A1 | 6/2004 |

* cited by examiner

*Primary Examiner* — Quang N Vo

(74) *Attorney, Agent, or Firm* — FabianVanCott

(57) ABSTRACT

A method of vending a physical copy of a digital image includes embedding a version of the digital image and software for purchasing the physical copy of the image from an online image provider into source code for a website, such that, when the website is displayed, the version of the digital image is displayed and the software for purchasing is controlled through a user interface displaying the website.

14 Claims, 10 Drawing Sheets

METHOD AND SYSTEM OF VENDING A COPY OF A DIGITAL IMAGE

BACKGROUND

Cameras have been used for decades to capture photographic images by both professional and amateur photographers. In recent years, cameras that capture and store images digitally have become increasingly prevalent over more traditional film cameras. Digital cameras are generally capable of capturing and storing large numbers of photographic images, which may then be selectively displayed, printed on physical media, permanently stored or discarded.

A variety of media have proliferated in response to the demand for practical digital image display solutions. Of these, internet websites are particularly prominent. These websites may be accessed from any one of millions of computing devices that are connected to the internet worldwide. As such, internet websites can inexpensively and efficiently provide digital images to a large audience by displaying the images on computing devices accessing the websites. Moreover, internet websites are relatively easy to set up and maintain, inexpensive to operate, and customizable.

When a physical copy of a digital image is desired, one can typically be obtained from a professional photo printing service for a fee or from a home printer.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
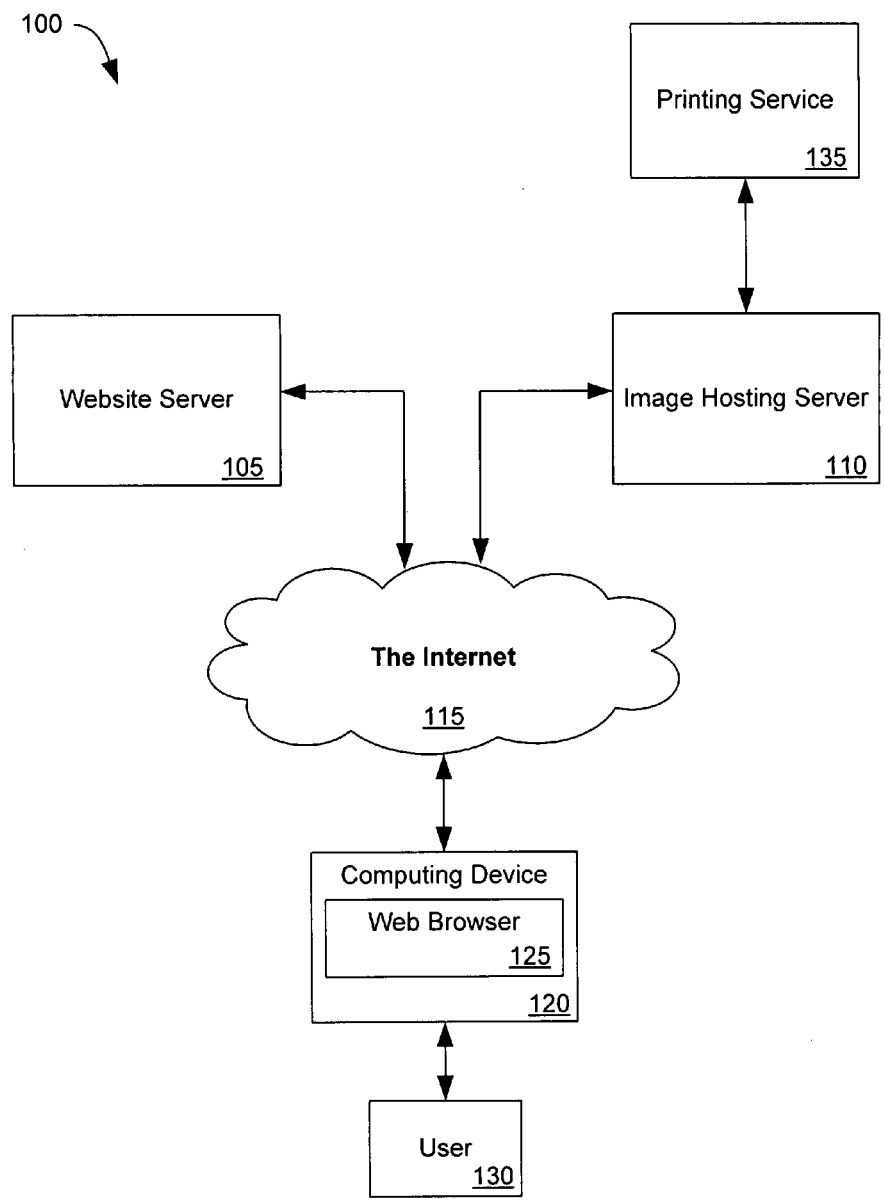
FIG. 1 illustrates an exemplary system for ordering a physical copy of a digital image, according to principles described herein.

In some cases, users may desire to display digital images they have captured within websites that they themselves create, such as personal websites, family websites, social networking websites, and the like. However, due to bandwidth and space limitations, users may post a relatively low quality or low resolution version of the picture to their website. Alternatively, the digital images may be hosted on an internet server that is separate from the server that hosts the personal websites so as to reduce the bandwidth requirements on the personal website.

Furthermore, people who view personal and other websites may desire to obtain physical copies of digital images shown on the websites. Typically, the purchaser will desire a high quality, high resolution physical copy of the picture in question. If an option to order such a high resolution physical copy of a website picture exists, currently the viewer of a personal website must typically navigate to a separate internet website to order a physical copy of a digital image from the website. This process diminishes the viewers' experience considerably, as the viewers are no longer able to select and examine images within the original website once they have navigated to the separate website to order the physical copy.

Additionally, owners or purveyors of digital images may wish to display proprietary images on internet websites, while receiving compensation for physical copies that are made and sold of the images.

To address the issues of hosting digital images on a personal website and vending physical copies of the images from within the personal website, the present specification describes systems and methods of vending a physical copy of a digital image. The systems and methods enable digital images to be uploaded to an online image provider. The digital images and software for purchasing physical copies of the digital images are embedded in a website, and the website is displayed in a computing device. The software for purchasing the digital images may be run upon performance of a predetermined action by a user, such as clicking on an embedded print button.

As used in the present specification and in the appended claims, the term "camera" refers to a device having a lens and aperture through which an image is projected and captured either on a physical medium, such as film, or electronically. Cameras as thus defined include, but are not limited to, digital cameras, video cameras, film cameras, and combinations thereof.

As used in the present specification and in the appended claims, the term "digital image" refers to both still and moving images obtained by digital cameras, scanners, computer software, and the digital sampling of images from film-based cameras. Examples of digital images as thus defined include, but are not limited to, images displayed on a computer or other screen, digital representations of images, images stored on physical media, printed images, and combinations thereof. Digital images may also comprise accompanying sound.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to exemplary systems and methods of vending a physical copy of a digital image.

Exemplary System

Referring now to FIG. 1, an exemplary system (100) for vending a physical copy of a digital image is shown. The system (100) includes a computing device (120) running software for a web browser (125) application. The computing device (120) has an interface through which a user (130) may access content being displayed by the computing device (120). The computing device (120) is in communication with the Internet (115). A website server (105) and an image hosting server (110) are also connected to the Internet (115), and by extension, in selective communication with the computing device (120). The image hosting server is in communication with a printing service (135) configured to create physical copies of digital images.

The computing device (120) is configured to receive information from the Internet (115) which may then be accessed by the user (130). Additionally, the computing device (120) may be configured to provide information to the website server (105) and the image hosting and printing server (110) through the Internet (115). The web browser (125) is configured to retrieve, from servers connected to the Internet (115), information of a specific format, such as source code for websites written or generated utilizing, for example, hypertext markup language (HTML), dynamic hypertext markup language (dHTML), Flash, Java, their derivatives, and combinations thereof.

The source code for a website may include references to files, such as images or sound, that are to be integrated into the website as displayed to the user (130) through the web browser (125). Some of these referenced files may be downloadable from the same server from which the website source code was obtained. Alternatively, some or all of the referenced files may be downloadable from a separate internet server.

In the present system (100), the computing device (120) is configured to retrieve the source code for a website from the website server (105) through the internet (115). The website server (105) provides source code for the website, which is executed by the web browser (125) to produce a representation of the website accessible by the user (130) on the computing device (120). The source code for the website includes instructions to download at least one digital image and image purchasing software from the image hosting server (110).

As the source code for the website is executed, the at least one digital image retrieved from the image hosting server (110) is embedded and integrated into the website by the web browser (125), and the at least one digital image is shown in a portion of the display interface of the web browser (125) designate by the source code. The image purchasing software downloaded from the image hosting server (110) may also be embedded in the website and configured to execute within the web browser (125) without navigating away from the website of the website server (105). Thus, the user (130) can interact with the image purchasing software and the image hosting server (110) without navigating away from the website being viewed as downloaded from the website server (105).

For example, the user (130) may interact with the purchasing software embedded in the website with a predetermined action such as a mouse click in a specified portion of the display of the web browser (125). In some embodiments, the at least one digital image from the image hosting server (110) is displayed in the web browser with a "print" or similar button adjacent to, overlaid on, or otherwise associated with the image. The image purchasing software may be configured to execute within the website by the user (130) positioning a cursor over the "print" button and pressing (i.e. "clicking") a button on a mouse or similar device used to manipulate an on-screen cursor. In other embodiments, the predetermined action may include mouse or pointer gestures, keystrokes, indications from peripheral devices, and combinations thereof.

Continuing the present example, once the predetermined action has been performed, the image purchasing software is executed within the website as a dynamic HTML window that opens within the website. Consequently, the image purchasing software may be used to facilitate an internet transaction through which the user (130) purchases a physical copy of at least one digital image hosted by the image hosting server (110). Moreover, the transaction is conducted in a dynamic window that opens within the website or page served up by the website server (105), and the user (130) need not navigate to a separate internet website to conduct the transaction. Furthermore, once the transaction is completed or cancelled, using the purchasing software in the dynamic window of the website, the dynamic window may disappear from the website, thus allowing the user (130) to continue perusing the website without having to navigate back to the website and the point at which the user (130) was previously.

In the present example, the details of the transaction are transmitted to the image hosting server (110) or another server affiliated with the purveyors of the printing service (135). The details of the transaction are received by the printing service (135), which finalizes the transaction and makes arrangements to deliver the requested physical copy of the at least one digital image to the user (130). The user (130) may pay a fee to receive the digital image. In some embodiments, a portion of the financial proceeds from physical copies of digital images ordered from websites in this manner may be paid to the owners and/or purveyors of these websites, e.g., the operator or owner of the website server (105).

Exemplary Methods

Figure 2:
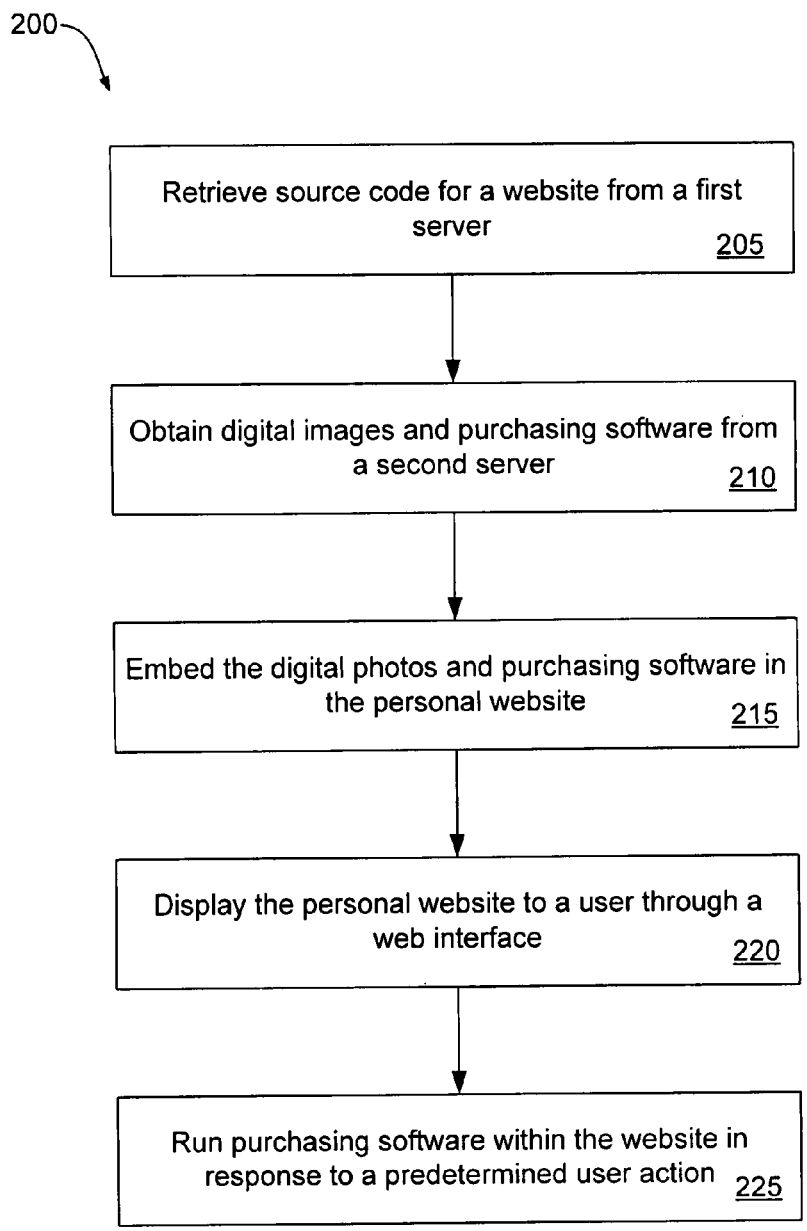
FIG. 2 is a flowchart illustrating an exemplary method of vending physical copies of a digital image, according to principles described herein.

Referring now to FIG. 2, an exemplary method (200) of ordering a physical copy of a digital image is shown. The method (200) includes retrieving (step 205) source code for a website from a first server and obtaining (step 210) at least one digital image and software for purchasing the at least one image from a second server under instructions embedded in the source code for the website. The second server is operated by or contracted by an online image provider and hosts electronic files of the at least one image and image purchasing software. The image purchasing software is configured to conduct transactions with a user that desires to purchase a physical copy of at least one digital image hosted by the second server.

The method (200) further includes embedding (step 215) the at least one digital image and purchasing software in the website source code. The source code retrieved (step 205) from the first server may include instructions for a web browser to obtain (step 210) the at least one digital image and accompanying software from the second server. The website, including the at least one digital image retrieved from the second server, is then displayed (step 220) to a user through a web interface, such as an internet browser.

Figure 3:
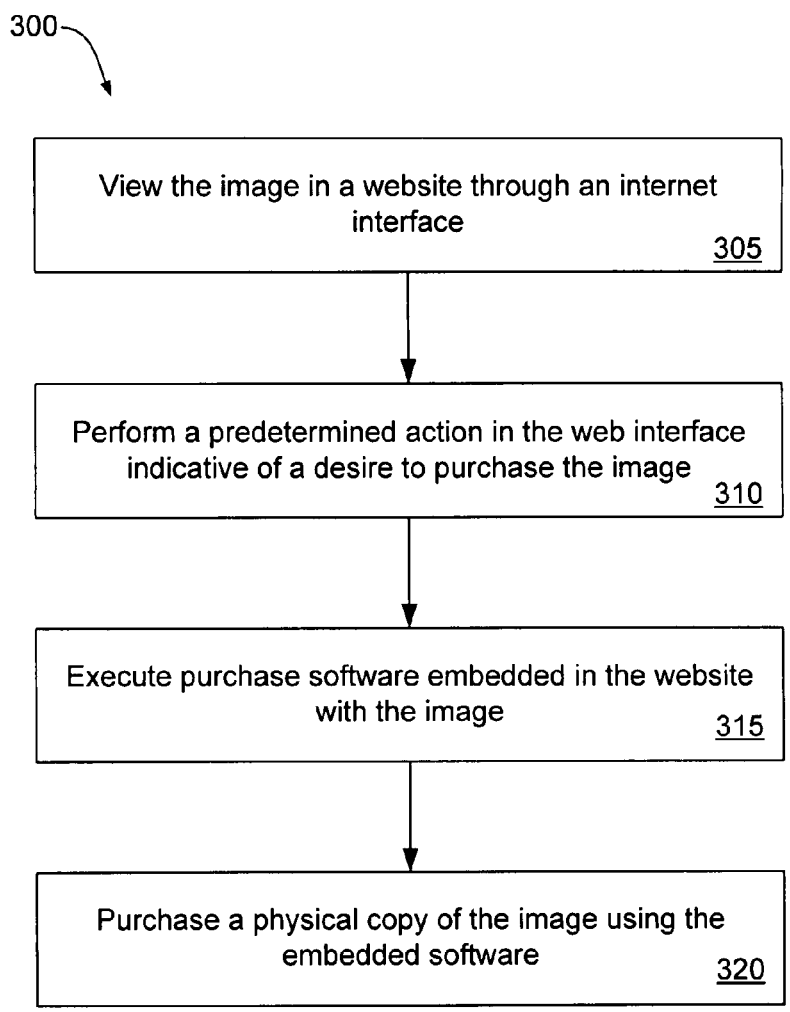
FIG. 3 is a flowchart illustrating an exemplary method of purchasing a physical copy of a digital image.

Referring now to FIG. 3, a flowchart illustrating a method (300) of purchasing a physical copy of a digital image is shown. The method (300) includes viewing (step 305) in an internet interface, such as an internet web browser, a website from the internet that includes the digital image. A predetermined action indicative of a desire to purchase the digital image, such as a mouse click, is then performed (step 310) in the web interface.

Purchasing software embedded in the website with the digital image is then executed (step 315). The embedded purchasing software is configured to execute and interact with a user through a graphical user interface window that appears within the display of the original website. As will be apparent to one skilled in the art, such windows may be implemented using protocols and programming languages such as dynamic HTML, Java Script, Flash, and the like. The purchasing software allows the user to purchase (step 320) a physical copy of the digital image online without exiting or navigating away from the original website.

Details from the purchase transaction may be transmitted over the internet to an image printing service that bills and delivers a physical copy of the image to the user. The printing service may have very high resolution copies of the requested image and the printing equipment to produce a very high quality or professional grade reproduction of the requested image for the purchaser. The purchaser may then pick up the print or have the print shipped to the purchaser's location.

Figure 4:
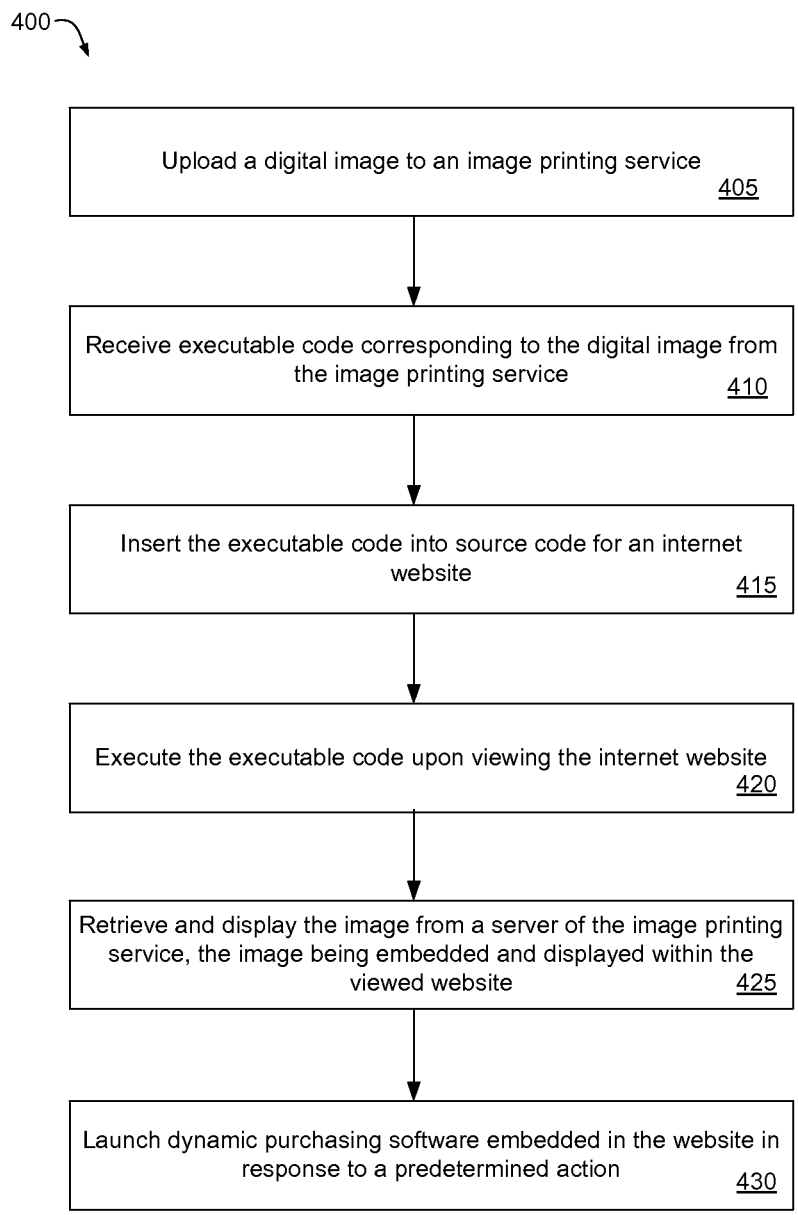
FIG. 4 is a flowchart illustrating an exemplary method of embedding a digital image and software in a website, according to principles described herein.

Referring now to FIG. 4, a flowchart illustrating a method (400) of vending a physical copy of a digital image is shown. The method (400) includes uploading (step 405) a digital image to an image printing service. Executable code corresponding to the digital image is then received (step 410) from the image printing service and inserted (step 415) into the source code for an internet website. For example, the image printing service may provide a few lines of source code with instructions that the recipient, the party uploading the digital image, cut and paste the provided lines of code into the source code for the corresponding website. This makes it very easy for a less sophisticated user to couple their images and a shopping cart applet into a website while hosting those images on the servers of the online printing service.

When run, the executable code causes an internet interface, such as a web browser, to download the digital image from a server owned or affiliated with the image printing service. The digital image may then be displayed in, i.e., as part of, the website.

Additionally, the executable code including the shopping cart applet causes the internet interface to retrieve dynamic purchasing software that is embedded in the website and is launched when a user performs a predetermined action. The predetermined action may be, for example, a mouse click on a print button superimposed on or otherwise associated with the displayed digital image. The executable code may include a unique identifier for the digital image, a unique identifier for the owner of the image, and an instruction to download javascript code from the image printing service to dynamically write the image, the print button, and the purchasing software into the source code of the website. Furthermore, the executable code may be parameterized to allow changing the image size or showing the print button in different fonts, colors, locations, formats, etc.

The method (400) further includes executing (step 420) the executable code in a user's internet browser, retrieving and displaying (step 425) the digital image from the image printing service, and launching (step 430) the dynamic purchasing software embedded in the website in response to a predetermined action. A transaction may then be conducted by using the dynamic purchasing software to allow a user to select the digital image(s) for which physical copies are desired, select a physical media on which the copies are desired, and submit billing information. Transaction information is then transmitted to the image printing service by the dynamic purchasing software. In some embodiments, proceeds from the sale of physical copies of digital images are shared with the owners and/or purveyors of the digital images and the website, and/or with the copyright owner for the image.

Figure 5:
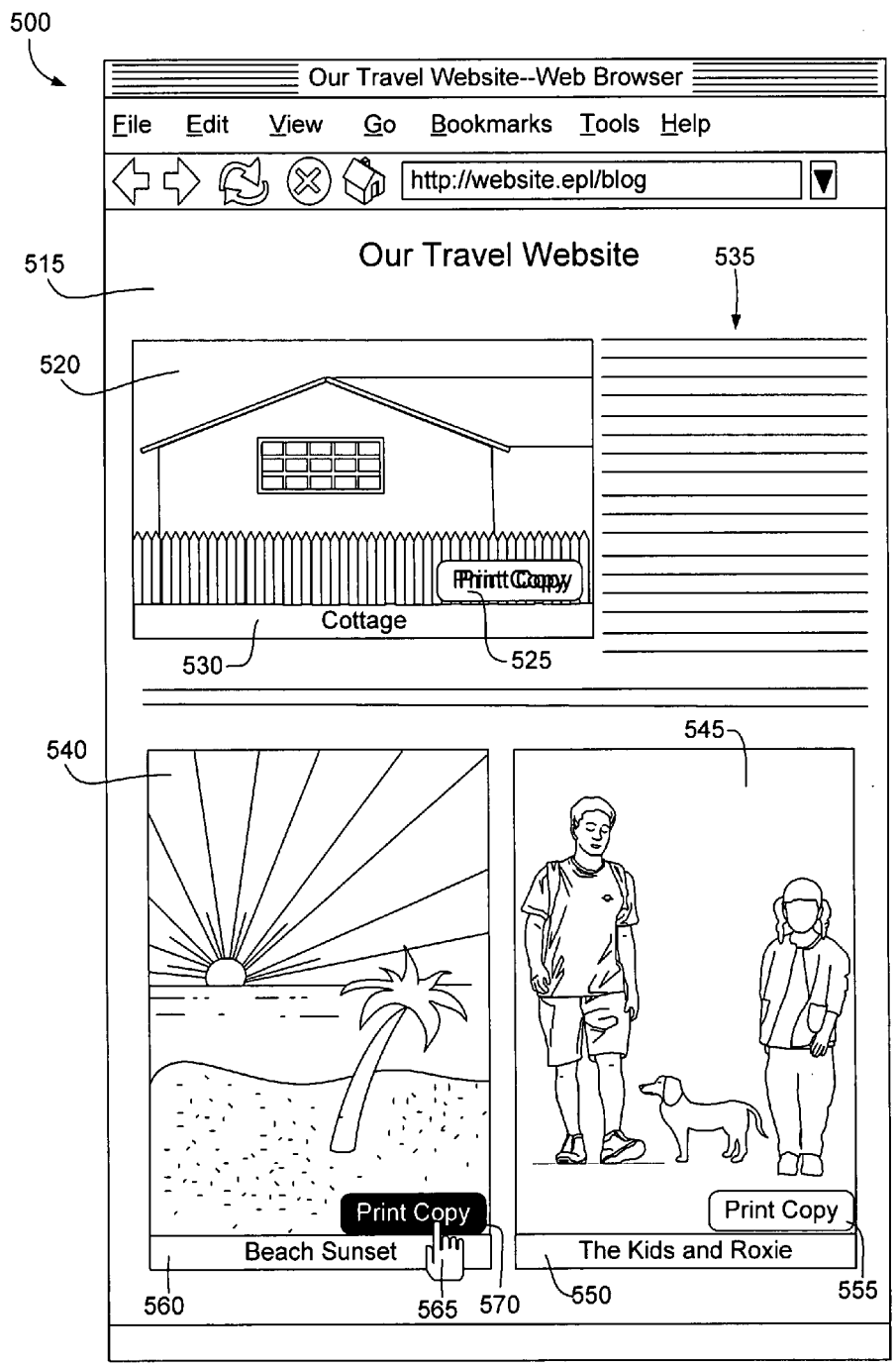
FIG. 5 illustrates an exemplary screenshot of a web browser, according to principles described herein.

Referring now to FIG. 5, an illustration of an exemplary web browser display (500) is illustrated. The exemplary web browser is displaying an exemplary website (515), according to the principles of this specification. In the present example, the website (515) is a personal website aimed at showcasing digital photographs (520, 540, 545), with captions (530, 550, 560) and accompanying text (535), that were taken by the authors of the website (515) during travel activities.

Each of the digital photographs (520, 540, 545) is hosted from a server affiliated with an online image printing service and includes a corresponding "print copy" button (525, 555, 570) associated therewith. In the illustrated example, the "print copy" buttons (525, 555, 570) are overlaid on the digital photographs (520, 540, 545) by the server hosting the photographs (520, 540, 545). In the present example, embedded image purchasing software from the online image printing service may be launched within the website by a user manipulating a cursor (565) with a mouse, touchpad, or other pointing device, and clicking a button on the pointing device when the cursor (565) is over the "print copy" button (570) of a digital photograph (540) on the website of which a physical copy is desired.

Figure 6:
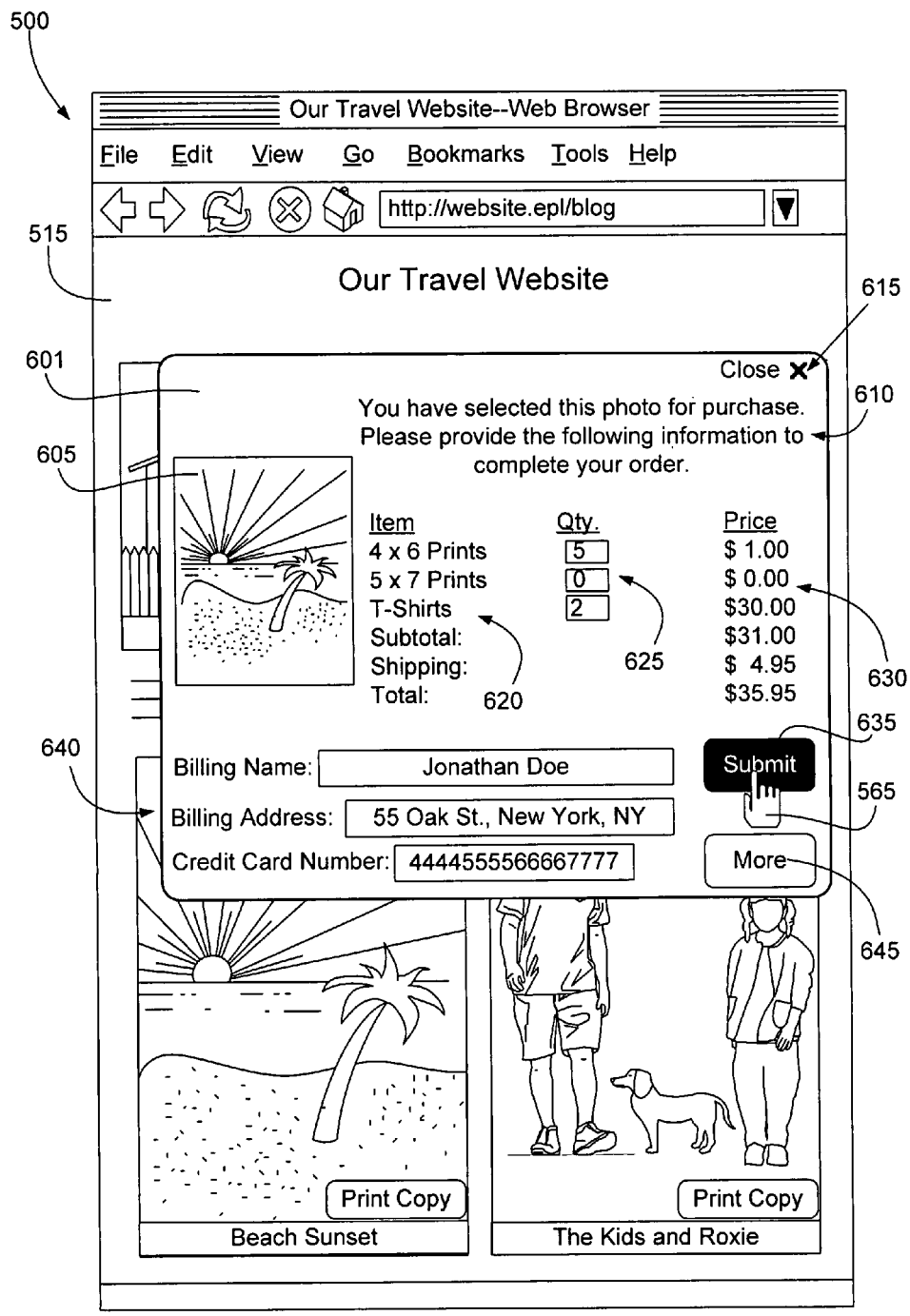
FIG. 6 illustrates an exemplary screenshot of a web browser, according to principles described herein.

Referring now to FIG. 6, an illustration of the exemplary web browser display (500) is shown with the image purchasing software launched within the website (515). The image purchasing software interfaces with a user through a dynamic window (601) that is superimposed on the original website (515) in the web browser display (500).

The dynamic window (601) of the image purchasing software of the present example includes a thumbnail display (605) of the photograph selected by the user in the original website (515), and of which a physical copy is desired. The dynamic window (601) includes a message (610) informing the user that the image shown in the thumbnail display (605) has been selected for purchase as a physical copy. The message (610) also prompts the user to provide additional information to the software in the dynamic window (601) to complete the order.

The dynamic window (601) of the image purchasing software includes an exemplary list (620) of physical media on which the selected image may be printed, together with interactive boxes (625) in which the desired quantity of each of the media may be entered by the user, and a list (630) of corresponding prices. Subtotal, shipping expense, and total price calculations may be made and displayed in the dynamic window (601).

Personal information (640), including billing and shipping information, may be collected from the user by the image purchasing software in conjunction with the order being made. The shipping information may specify a recipient other than the purchaser, for example, if the purchase is being made as a gift for the designated recipient. In some embodiments, additional purchasing options may be viewed by the user in the dynamic window (601) by clicking on a specified button (645) with the cursor (565). Moreover, by clicking a "submit" button (635) with the cursor (565), the details of the order may be transmitted to the online image printing service over the internet and the transaction may be completed.

Upon receipt of the order details, the online image printing service produces physical copies of the selected image on the user-selected media and delivers the physical copies to the user or a recipient designated by the user. As indicated above, the printing service may have very high resolution copies of the requested image and the printing equipment to produce a very high quality or professional grade reproduction of the requested image for the purchaser. The purchaser may then pick up the print or have the print shipped to the purchaser's location.

When the transaction is completed, the dynamic window (601) of the image purchasing software may be closed, thus allowing the user to return to viewing the website (515) at the point where he or she left off. Additionally, the image purchasing software may be closed at any time without conducting a transaction by clicking with the cursor on a "close" button (615). Additional physical copies of images on the website (515) may be ordered by clicking on the corresponding "print copy" buttons (525, 555, 570; FIG. 5) of the photographs (520, 540, 545; FIG. 5).

Figure 7:
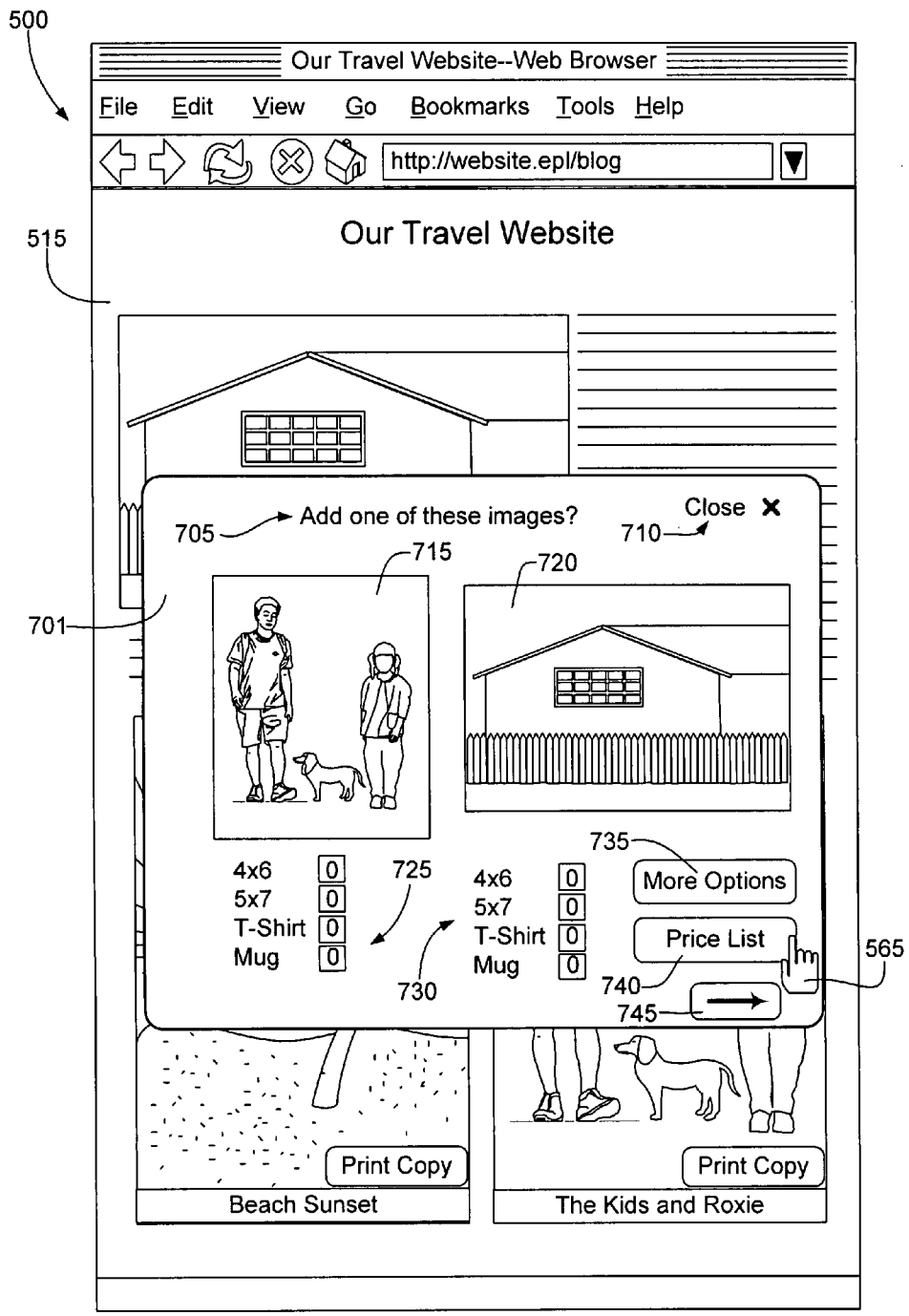
FIG. 7 illustrates an exemplary screenshot of a web browser, according to principles described herein.

Referring now to FIG. 7, an alternative exemplary dynamic window (701) is shown. The exemplary dynamic window (701) may appear within the website (515) upon a user clicking with the cursor (565) on a "print copy" button (570; FIG. 5) of one of the photographs (545; FIG. 5) in the website (515). Prior to requesting personal information from the user to complete the transaction, the user is presented with thumbnail images (715, 720) of other images from the website (515) of which physical copies may also be made. A message (705) prompts the user with the option to add physical copies of the images represented by the thumbnail images (715, 720) to an order.

Furthermore, lists of available physical media (725, 730) associated with each of the thumbnail images (715, 720) allow the user to select quantities of each of the media for the additional images to add to the original order. The user may continue to a checkout portion of the purchasing software in the dynamic window (701) by clicking with the cursor (565) on a corresponding button (745) in the dynamic window (701). Additional exemplary buttons (710, 735, 740) allow the user to close the dynamic window (701), view more order options, and view a price list, respectively.

Figure 8:
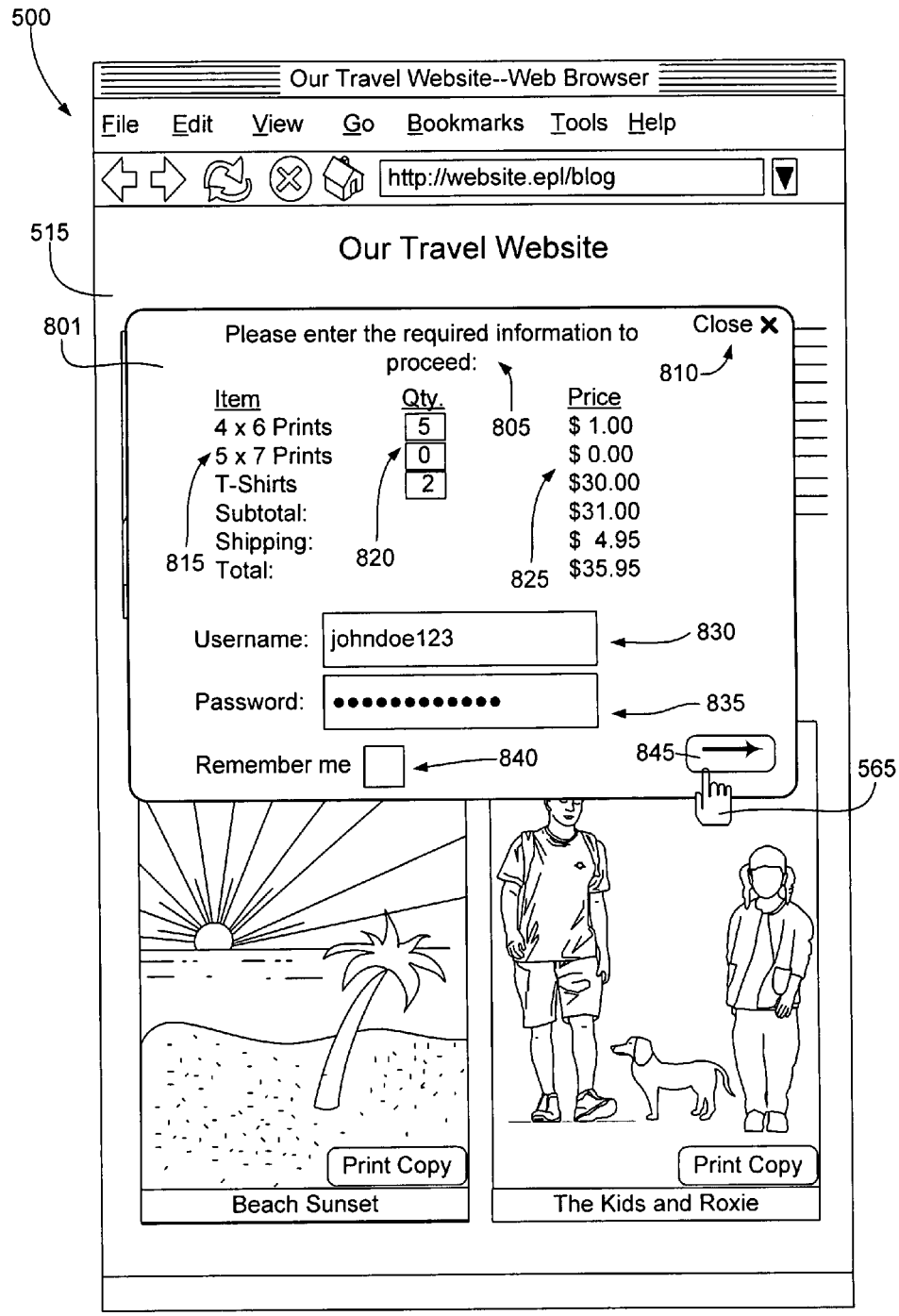
FIG. 8 illustrates an exemplary screenshot of a web browser, according to principles described herein.

Referring now to FIG. 8, another exemplary dynamic window (801) in the web browser display (500) is shown. The exemplary dynamic window (801) includes a text prompt (805), an item list (815), a quantity list (820), a price list (825), and a close button (810) consistent with the principles of the present specification. The exemplary dynamic window (801) also includes interactive boxes (830, 835), into which a user may enter a username and password to the online printing service. In this way, the online printing service may retrieve a user's previously stored billing information from a database and complete the transaction without requiring the user to reenter his or her billing information. Moreover, an interactive check box (840) may be selected that enables the user to remain signed in with the online printing service for a specified period of time, such that the user need not enter his or her username and password for each physical copy of a digital image that is ordered. Alternatively, the interactive check box (840) may cause the printing service server (110, FIG. 1) to place a cookie on the computer the user is operating that contains the user's username and password so that, so long as the user is accessing the printing service from that computer, the username and password are automatically entered into the browser from the cookie. The transaction is continued by clicking on a corresponding button (845) with the cursor (565).

Figure 9:
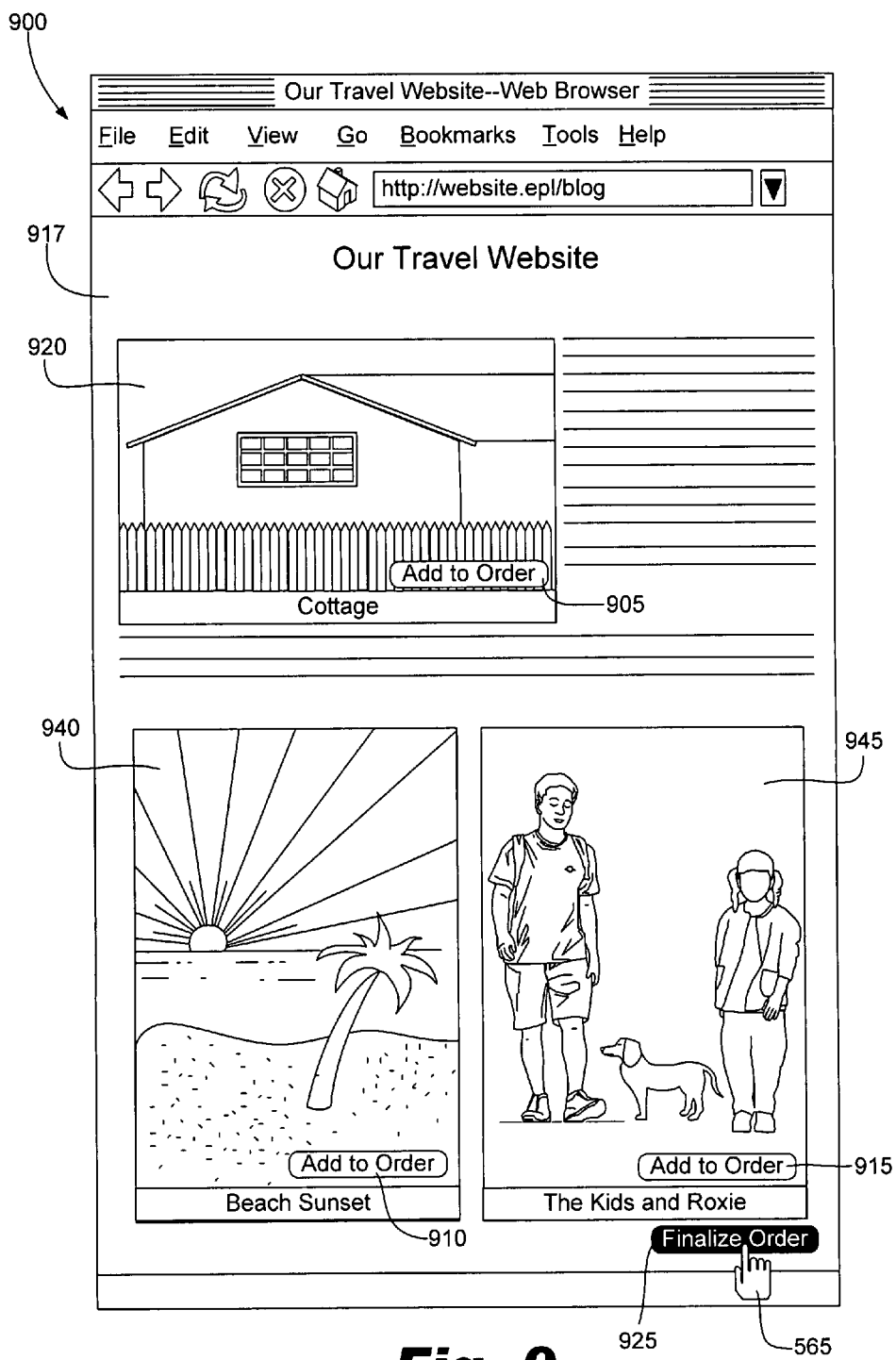
FIG. 9 illustrates an exemplary screenshot of a web browser, according to principles described herein.

Referring now to FIG. 9, another exemplary web browser display (900) is shown. The exemplary web browser is displaying a website (917) consistent with the principles of the present specification. A plurality of digital photographs (920, 940, 945) are hosted from an online image printing service, and each of the digital photographs (920, 940, 945) includes a button (905, 910, 915) for adding that particular image to an order of physical copies of selected images. A user may perform a predetermined action, such as clicking with the cursor (565) on a "finalize order" button (925) to launch a dynamic window interface that collects additional information from the user to complete the transaction.

Figure 10:
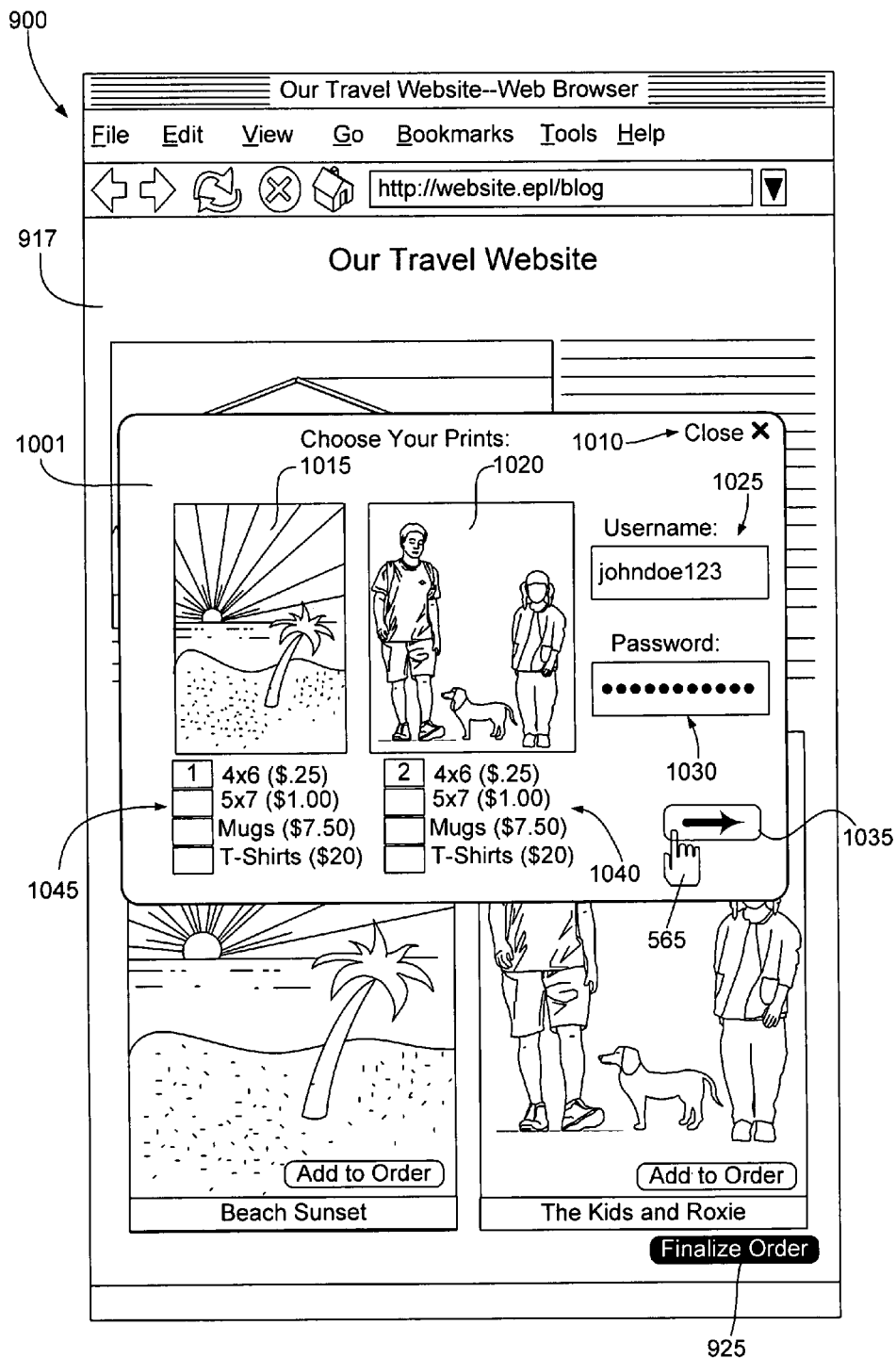
FIG. 10 illustrates an exemplary screenshot of a web browser, according to principles described herein.

Referring now to FIG. 10, the exemplary web browser display (900) is shown displaying an exemplary dynamic window (1001) that may appear in the website (917) when the "finalize order" button (925) is clicked. The dynamic window (1001) includes thumbnail images (1015, 1020) of digital photographs (940, 945; FIG. 9) selected by the user with the "add to order" buttons (910, 915; FIG. 9).

The exemplary dynamic window (1001) serves as a checkout mechanism for the user to complete the purchase of physical copies of the selected images. Lists of available physical media (1040, 1045) with corresponding quantity boxes may be used to specify the quantity and type of physical media on which the copies of the selected digital images are desired. Username and password boxes (1025, 1030, respectively) may be used to retrieve billing and shipping information corresponding to a specific user making the order and serve as authorization by the user to proceed with the transaction.

The transaction may be finalized, or more purchase options considered, by clicking on a designated button (1035) with the cursor (565). The dynamic window may be closed, and perusal of the website resume, by clicking on a close button (1010) with the cursor (565).

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method of vending a copy of a digital image, said method comprising;
   over a computer network, receiving, from a user, an upload of a digital image, said digital image being received by an image hosting server operated by an online image provider;
   in response to receiving said digital image, transmitting, to said user, code for embedding in source code for a website operated by said user, said code, when executed, embedding a version of said digital image and software for purchasing said copy of said image from said image hosting server of said online image provider into a webpage output by a website server for said website operated by said user
   such that, when said website is displayed in a browser, said version of said digital image is displayed and said software for purchasing is controlled through a user interface of said browser displaying said website.

2. The method of claim 1, wherein said digital image is uploaded by, and received from, an owner of said digital image and is hosted by said online image provider who is different and separate from said owner.

3. The method of claim 1, wherein said digital image is uploaded by, and received from, a purveyor of said image with rights to sell copies thereof.

4. The method of claim 1, further comprising:
   said user receiving said code; and
   inserting code into said source code for said website to embed said digital image and said software into said website, wherein said website server is separate from and not operated by said online image provider.

5. The method of claim 1, further comprising:
   displaying said website on a computing device belonging to a potential purchaser of said digital image; and
   running said software within said website;

wherein said displaying said website on said computing device comprises retrieving said image and said software from said online image provider separate from an operator of said website.

6. The method of claim 5, further comprising completing a financial transaction with said potential purchaser of said computing device through said software and transmitting information from said transaction to said online image provider, said potential purchaser then being a purchaser of said digital image.

7. The method of claim 6, further comprising delivering a physical copy of said image to said purchaser.

8. The method of claim 6, further comprising compensating an owner or purveyor of said image with a portion of proceeds received from said transaction.

9. The method of claim 1, further comprising receiving, through said software, a selection of at least one type of medium on which a physical copy of said digital image is to be printed for a purchaser.

10. A system for vending a copy of a digital image comprising;
an image hosting server for receiving, from a user over a computer network, an upload of a digital image;
said image hosting server also hosting software for purchasing a copy of said digital image;
said image hosting server, in response to receiving said digital image, being programmed for transmitting, to said user, code for embedding in source code for a website operated by said user, said code, when executed, embedding a version of said digital image and software for purchasing said copy of said image from said image hosting server into a webpage output by a website server for said website operated by said user such that, when said website is displayed in a browser, said version of said digital image is displayed and said software for purchasing is controlled through a user interface of said browser displaying said website.

11. The system of claim 10, wherein said image hosting server conducts a financial transaction with a purchaser of said copy of said digital image using said software.

12. The system of claim 11, further comprising a printing service for producing and delivering a physical copy of said image to said purchaser.

13. The system of claim 12, wherein said image hosting server receives, through said software, a selection of at least one type of medium on which said physical copy of said digital image is to be printed for said purchaser.

14. The system of claim 11, wherein said image hosting server further determines compensation for an owner or purveyor of said image with a portion of proceeds received from said transaction.

* * * * *